IRA S. HAMILTON.

Improvement in Swaging Tools for Boiler Tubes.

No. 121,512.                          Patented Dec. 5, 1871.

Attest
Henry Millward
W<sup>m</sup> R. McComas.

Inventor
Ira S. Hamilton
By F. Millward
Attorney

UNITED STATES PATENT OFFICE.

IRA S. HAMILTON, OF HAMILTON, OHIO, ASSIGNOR TO HIMSELF AND OWENS, LANE, DYER & CO., OF SAME PLACE.

IMPROVEMENT IN SWAGING-TOOLS FOR BOILER-TUBES.

Specification forming part of Letters Patent No. 121,512, dated December 5, 1871.

*To all whom it may concern:*

Be it known that I, IRA S. HAMILTON, of Hamilton, Butler county, State of Ohio, have invented a certain new and useful Swaging-Tool for Beading the Ends of Boiler-Flues, of which the following is a specification:

My invention is designed to accomplish by rotary swaging action what has heretofore been done by hand hammering; and consists of a tool composed of a spindle adapted to revolve within the tube, fitted at right angles to its axis, with swaging-rollers grooved on the peripheries, the spindle being arranged to feed toward the work by any suitable device, and revolve by hand or power, in such a way as to cause the rollers to form a bead on the end of the tube.

Figure 1:
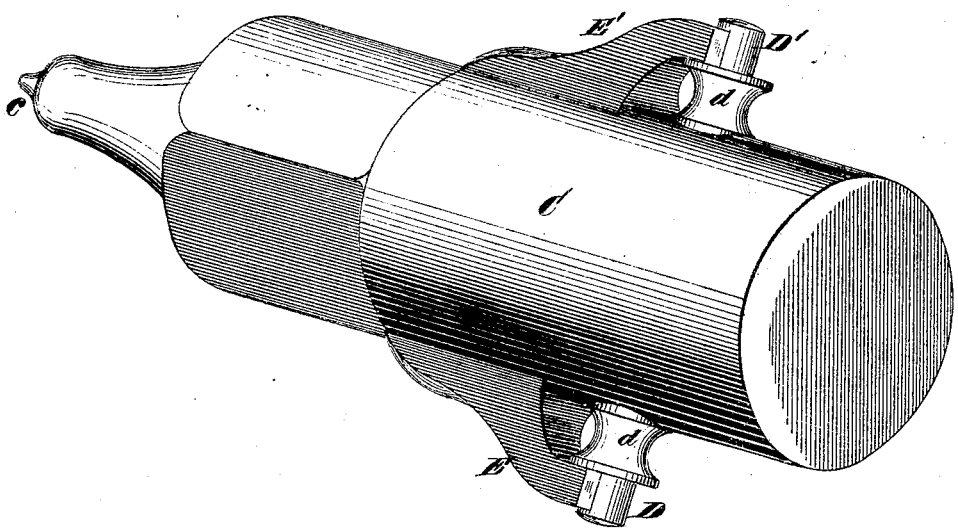
Figure 2:
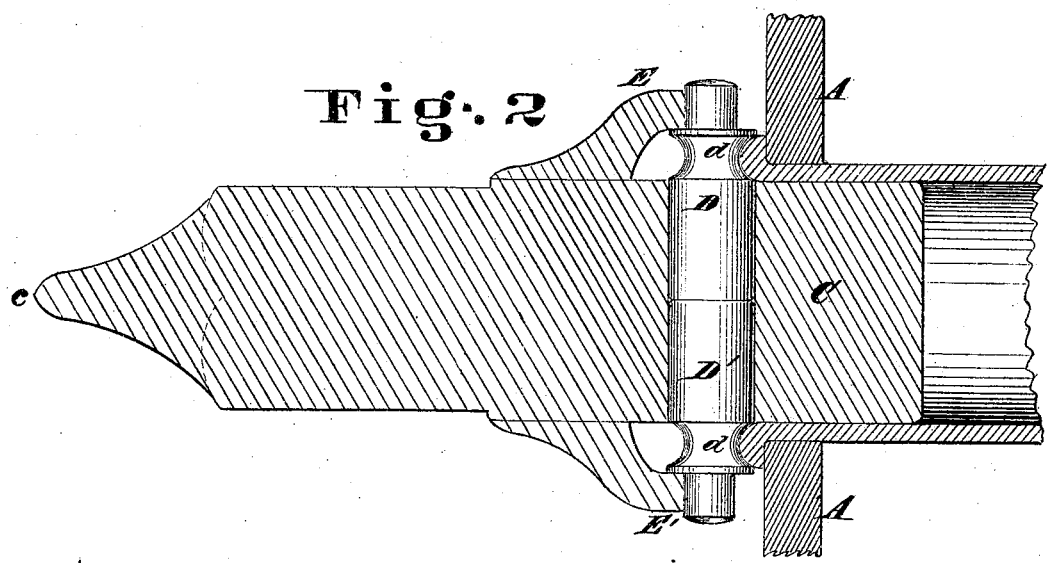

Figure 1 is a perspective view of my device. Fig. 2 is an axial section of the same.

A represents a boiler-head with one flue in place properly beaded. C is a spindle, constructed of a size to snugly fit the tube to be beaded. It terminates at the outer end in a hardened center, c, which is adapted to rotate against the stationary device which feeds it forward. The latter may consist of a cross-bar and feeding-screw supported by the boiler-head, such as is used in connection with ratchet-drills, &c. A part of the spindle C is formed square for the introduction of a wrench to operate the tool. Two spindles, D D', are inserted in spindle C at right angles to the latter, each being journaled at one end within the spindle C, and at the opposite end in projecting bearings E E'. The spindle may be so constructed that the bearings E E' may be cast or otherwise formed in one piece with the spindle, or the bearings may be in separate pieces rigidly secured to the spindle. The small spindles D D' may have bearings in the spindle of the full diameter, as shown, or the bearings may be small, similar to those shown at E E'. Between the bearings E E' and the spindle C the spindles D D' are provided with grooves d, of a size and shape corresponding with the shape and size of the bead required upon the end of the tube to be beaded.

In the operation of this tool the spindle C is first inserted in the tube to be beaded and the device employed to form the support and feed the spindle to the work is adjusted in place. The spindle C is then turned by a wrench or otherwise, and in this rotary action the bead is formed upon the tube by means of the grooved rollers D D' d, which revolve in the bearings as the spindle C is rotated.

I claim—

The improved tool, constructed substantially as described.

In testimony of which invention I hereunto set my hand.

IRA S. HAMILTON.

Witnesses:
FRANK MILLWARD,
ELITHA F. LAYMAN.

(163)